United States Patent [19]

Saunders

[11] 4,211,179
[45] Jul. 8, 1980

[54] COLUMNAR STRUCTURE

[76] Inventor: Louie G. Saunders, 3 Turnberry Ave., Bunkers Hill, East London, Cape Province, South Africa

[21] Appl. No.: 914,687

[22] Filed: Jun. 12, 1978

[30] Foreign Application Priority Data

| Jun. 15, 1977 | [ZA] | South Africa | 77/3603 |
| Sep. 12, 1977 | [ZA] | South Africa | 77/5464 |
| Oct. 20, 1977 | [ZA] | South Africa | 77/6268 |

[51] Int. Cl.² .................... B63H 9/10; E04H 12/00
[52] U.S. Cl. .................... 114/90; 114/105; 52/731; 264/328
[58] Field of Search .................... 52/730–732, 52/423, 724, 725, 727, 728, 586; 156/79, 305; 264/328; 29/526; 114/90, 105

[56] References Cited

U.S. PATENT DOCUMENTS

| 694,320 | 2/1902 | Miller | 52/586 |
| 1,294,115 | 2/1919 | Knight | 52/586 |
| 2,040,126 | 5/1936 | Grieve | 156/305 |
| 2,534,501 | 12/1950 | Coleman | 52/586 |
| 3,156,210 | 11/1964 | Lyon | 52/394 |
| 3,160,249 | 12/1964 | Pavlecka | 52/586 |
| 4,072,121 | 2/1978 | Anderson et al. | 114/90 |

FOREIGN PATENT DOCUMENTS

| 443954 | 2/1968 | Switzerland | 114/90 |
| 571630 | 1/1976 | Switzerland | 52/731 |
| 629115 | 1/1947 | United Kingdom | 52/40 |
| 1087232 | 4/1965 | United Kingdom | 114/90 |

Primary Examiner—James L. Ridgill, Jr.

[57] ABSTRACT

A hollow columnar structure fabricated from at least two, part-oval, extruded aluminium sections and intended for use as a sailing vessel mast or boom, a lamp standard or as piping. The sections each have a longitudinally extending groove along each of the longitudinal edges thereof, the grooves of one section being contiguous with the grooves of another when the sections are placed in position to form the columnar structure. Each groove is T-shaped in section whereby, when two such grooves come into co-operating relationship, the resultant cavity is of H-section. An H-shaped extrusion of synthetic plastics material is then inserted in each of the cavities to join the sections. The extrusions can be drawn through the cavities or can be extruded directly into the cavities. In an alternative form the structure is solid. In yet another form each aluminium section has an external formation which, in conjunction with a corresponding formation of another section, receives and retains a plastics material extrusion which in turn prevents separation of the sections.

10 Claims, 12 Drawing Figures

COLUMNAR STRUCTURE

This invention relates to columnar structures suitable for use as masts or booms for sailing vessels, lamp standards for use on roads, airport aprons and other spaces which are to be illuminated, irrigation pipes, etc.

Applicant is aware that masts for sailing vessels are currently manufactured in a number of different ways. For relatively small masts one piece aluminum extrusions are employed, these extrusions being hollow and usually of oval cross-section. The extrusion die from which these masts are extruded comprises an outer die ring and an inner die core, the gap between these components determining the cross-sectional shape of the extrusions. The core is supported from the die ring by bridge pieces. At these bridge pieces the flowing aluminium is split into streams which rejoin as a single stream beyond the bridge pieces. The resulting 'cold weld' inevitably weakens the mast. Furthermore, extrusion technology limitations prevents this technique being employed in respect of masts of large cross-sectional area.

In accordance with other conventional techniques, the mast is fabricated from two or more extruded sections. For example, two extruded sections each of half-oval form can be used. The longitudinal edges of the two extrusions are, according to the first of these methods, butted against one another and then welded. Such welds are not only unsightly but often of doubtful strength, it being a characteristic of an aluminium weld that it occurs on the surface of the components rather than penetrating deeply into the material. An alternative technique is to overlap, drill and pop rivet the two sections. By way of example, a 15 meter mast may contain 400 to 500 rivets and take two skilled men in the region of four days to finish the work. The mast is, of course, weakened by virtue of the fact that it is extensively holed, and electrolytic currents in the mast (aggravated by conditions at sea) result in extensive corrosion. If the mast is large and more than two extruded sections are required, then the number of holes which must be drilled and the number of pop rivets which must be used increases substantially with a commensurate increase in cost.

Applicant is aware that masts have been fabricated using a mixture of welding and riveting techniques.

The present invention seeks to provide a sailing vessel mast which is not only less expensive to fabricate but has greater strength than masts of the form described above. The structure devised by applicant is not only suitable for use as a mast on a sailing vessel but also as a boom on such a vessel, and can be used for many other purposes as will be described.

According to one aspect of the present invention there is provided a longitudinally split columnar structure, the structure including first and second sections with a longitudinally extending edge of the first section juxtaposed to a longitudinally extending edge of said second section, and a fastening member extending in the direction of elongation of said sections and inter-engaging with faces of both said sections to prevent separation of said sections.

In one constructional form each of said sections includes a slot extending in the direction of elongation of the section, each slot, in cross-section, having a narrow entrance portion leading to a wider portion and said sections being arranged with said narrow entrance portions of the slots contiguous, said member having a cross-sectional shape compatible with the configuration of the longitudinally extending cavity constituted by said co-operating slots, and said member being in said cavity and engaging with faces of said cavity to prevent said sections separating.

The cross-sectional shape of the cavity and member can be H-like or of 'dumb-bell' form.

Said sections are preferably aluminium extrusions and said member can be of a nylon material. Nylon has the advantage that, when it becomes damp in use, it swells somewhat and this is advantageous in ensuring that it remains firmly in place.

In the preferred constructional form, the structure comprises two half shells, each of the two longitudinally extending edges of each half shell being juxtaposed to a longitudinally extending edge of the other half shell and there being two fastening members for preventing separation of said sections.

In a further form, the structure comprises more than two sections, the sections each being in the form of a shell with the longitudinally extending edges of each shell juxtaposed to longitudinally extending edges of adjacent shells, and there being fastening members for preventing separation of the adjacent shells, the shells together forming a hollow columnar structure.

In an alternative constructional form, said faces of said sections lie at angles with respect to one another and form the opposed faces of a dove-tail groove, the configuration of said member being such that part thereof is received in said dove-tail groove and part thereof lies outside said dove-tail groove.

In a still further form, said faces are directed away from one another and are oblique to one another, said member being formed with undercut surfaces which are directed towards one another and co-operate with said faces of said sections, the member acting as a retaining strap to prevent separation of said sections.

According to a further aspect of the present invention there is provided a method of manufacturing a columnar structure which method comprises juxtaposing a longitudinally extending edge of one section of the structure to a longitudinally extending edge of another section of the structure, and inter-engaging a fastening member with faces of both said sections to prevent separation of said sections, the fastening member being inter-engaged with said faces by sliding it in the longitudinal direction.

In one form of the method, the member is slid into a cavity defined partly by one of said sections and partly by the other of said sections.

In accordance with another specific form of the method, the fastening member acts as a retaining strap co-operating with a face of each section to prevent the sections moving apart.

In a third form, the fastening member may be inserted into a dovetail slot.

According to yet another aspect of the present invention there is provided a method of manufacturing a columnar structure which method comprises juxtaposing a longitudinally extending edge of an elongate first section to a longitudinally extending edge of an elongate second section, the edges of said sections being profiled so as together to bound and form a cavity extending in the direction of elongation of said sections, placing an extrusion nozzle in said cavity, and extruding synthetic plastics material directly into said cavity to form a fastening member which is inter-engaged with faces of said sections to prevent separation of said sections.

For a better understanding of the present invention reference will now be made, by way of example, to the accompanying drawings, in which.

Figure 11:
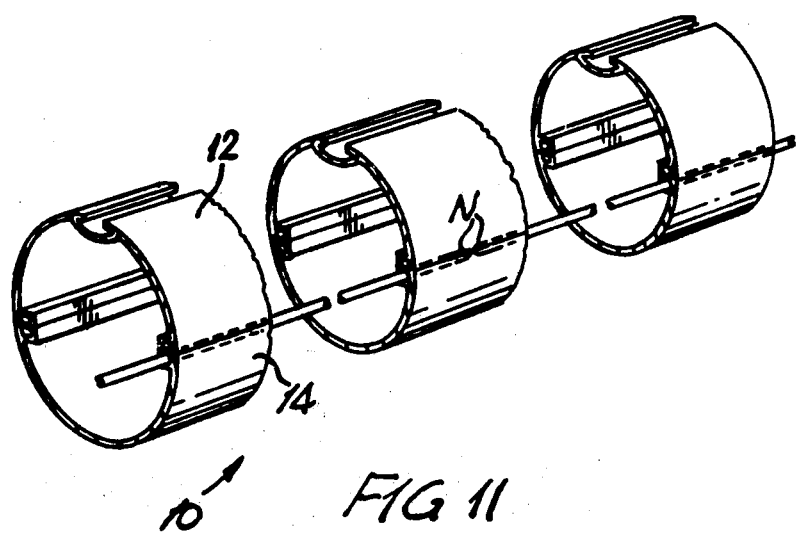

FIG. 11 diagrammatically represents the method of manufacturing the mast.

Figure 1:
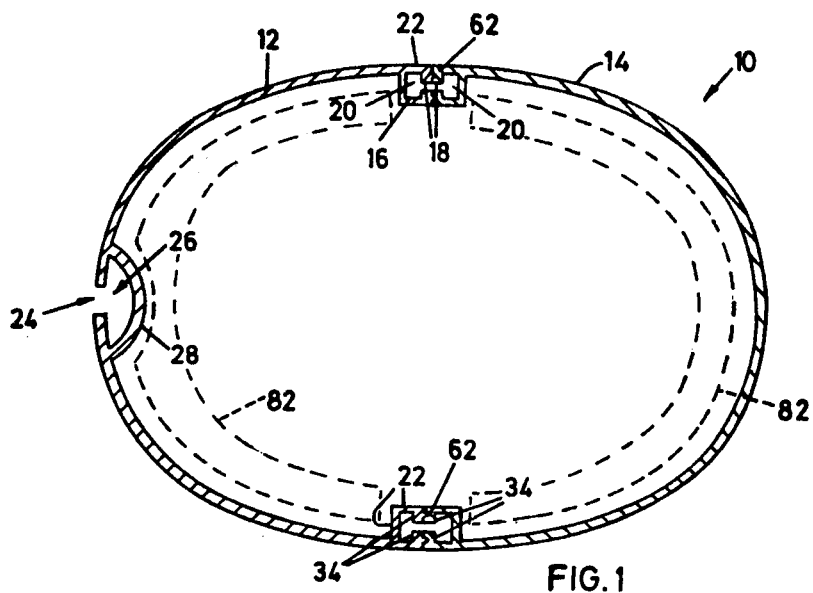
FIG. 1 is a horizontal cross-section through a longitudinally split mast for a sailing vessel.

Referring firstly to FIG. 1, the mast illustrated is generally referenced 10 and consists of two sections. In this embodiment the sections are half shells 12 and 14. The half shells 12 and 14 are both semi-elliptical in form and extend the full height of the mast.

The half shell 12 has, along its two longitudinally extending edges, formations in which there are two slots 16. Each slot 16 includes a narrow neck 18 which forms an entrance portion and leads to a wider portion 20, the slots thus being of T-section. In the illustrated embodiment, the portion 20 is generally rectangular in cross-section and is closed on all sides by longitudinally extending walls 22.

Mid-way between the slots 16, the half shell 12 is formed with a further longitudinal slot 24 which leads to a longitudinally extending recess 26. The slot 24 forms the means of access to the recess 26 which is closed at its rear by a wall 28 of arcuate section. The slot 24 and recess 26 form a slideway which guides movement of the sail (not shown) supported by the mast.

The half shell 14 is substantially identical to the half shell 12 except in that the slot 24, recess 26 and wall 28 are omitted.

Figures 1A, 5:
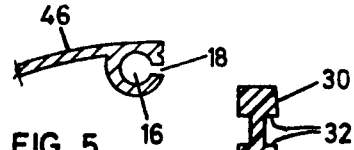
FIG. 1a is a cross-section, to a larger scale, through a fastening member.

When the half shells 12 and 14 are in the position illustrated, the narrow necks 18 form extensions one of the other. The result is that each pair of necks 18 and each pair of wider portions 20 define a longitudinally extending cavity which may be described as being of 'squarish figure eight' or H configuration. Each of the two cavities formed serves to receive a fastening member 30 such as is shown in FIG. 1a. The member 30 is generally of H-shape and it will readily be understood that its cross-section is compatible with the cross-section of each of said cavities. A single length of member 30, or if circumstances necessitate it, a plurality of shorter lengths of member 30, are pulled longitudinally into the two cavities constituted by the four slots 16. It will be understood that the faces 32 of the member 30, by co-operating with the faces 34 of the half shells 12 and 14, prevent the half shells 12 and 14 separating from one another.

The half shells 12 and 14 are preferably aluminium extrusions. The member 30 is an extrusion of a synthetic plastics material which does not deteriorate with time and which will slide into the cavities provided therefor without binding with the aluminium. Nylon based materials are suitable as are materials based on polytetrafluoroethylene. This latter material is more expensive than nylon. Nylon has the advantage that it swells when exposed to moisture.

Figure 2:
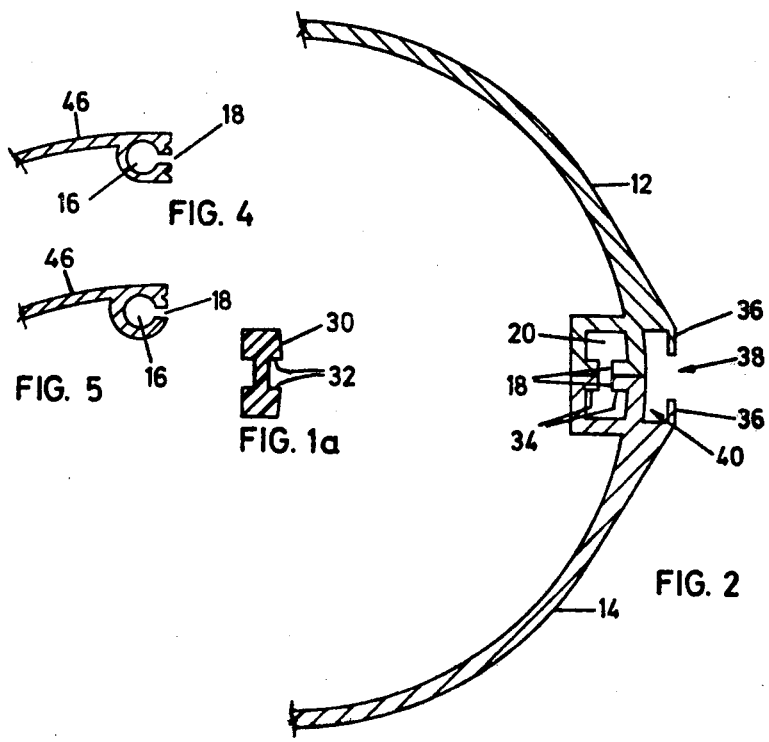
FIG. 2 is a cross-section illustrating part of each of the two half shells of a further mast.

In FIG. 2 only part of each half shell 12 and 14 has been illustrated and, where applicable, the same reference numerals as are used in FIG. 1 have been employed. In this constructional form the half shells 12 and 14 are extruded with formations 36 which, when the half shells are juxtaposed, together form a slot 38 and recess 40 equivalent to, and for the same purpose as, the slot 24 and recess 26. Formations 36 are not provided on the other juxtaposed portions of the half shells 12 and 14.

Figure 3:
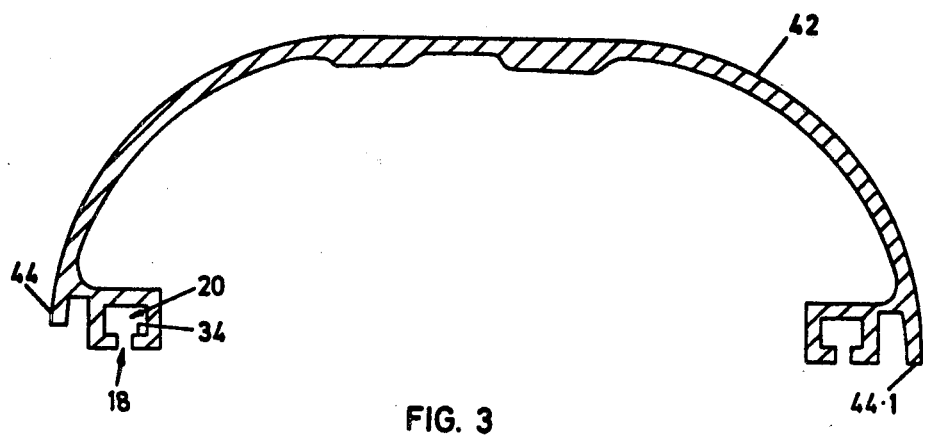
FIG. 3 is a cross-section illustrating another mast.

The construction of FIG. 3 is similar to the constructions thus far described and two of the half shells 42 illustrated co-operate to form the mast. Two fastening members of the form shown in FIG. 1a are required and each half shell is formed with a formation 44 which, in co-operation with a corresponding formation 44 of another half shell 42, defines a slot and recess similar to, and for the same purpose as, the slot 38 and recess 40. In the embodiment of FIG. 3 the mast is split in the fore and aft direction whereas, in the embodiments of FIGS. 1 and 2, the mast is split in the transverse direction. The formations 44.1 of the two half shells 42 abut and can, over a portion of their length, but cut away to form a guideway for a spinnaker.

Figure 4:
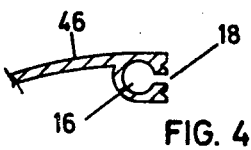
FIGS. 4 and 5 are detail views of two further forms of mast.
Figures 6, 8:
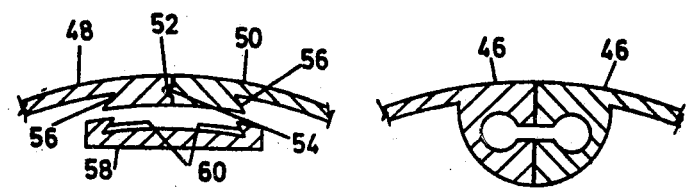
FIGS. 6 to 9 illustrate still further constructional forms.

FIGS. 4 and 5 illustrate two longitudinally extending edge portions of two half shells 46. In these constructional forms, the slots 16 again comprise narrow necks 18 and wider portions 20 and the wider portions are of generally circular cross-section. A similar arrangement is shown in FIG. 6 from which it will be seen that, when two half shells 46 are brought into juxtaposed relationship, a cavity of a 'dumb-bell' shape is formed. A fastening member, equivalent to the fastening member 30 but of a shape compatible with the cavity illustrated in FIG. 6, is provided but has not been illustrated.

Figures 7, 9:
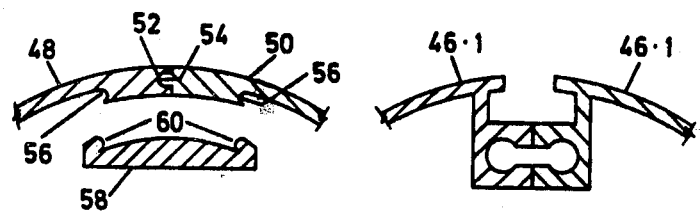

Similarly, in FIG. 7, two slightly different half shells 46.1 are illustrated, the cavity defined by these half shells being similar to the cavity shown in FIG. 6.

In FIG. 8 portions of two half shells 48 and 50 are shown. Along the longitudinally extending edge of the half shell 48 there is a vee-shaped recess 52 and a correspondingly shaped rib 54 is provided along the longitudinally extending edge of the half shell 50. The rib is entered in the recess and prevents the half shells 48 and 50 moving in a generally radial direction with respect to one another.

The half shells 48 and 50 are each formed with an angled face 56, the faces 56 being oblique to one another.

A fastening member 58 (shown for the sake of clarity adjacent the shells 48 and 50 and not in co-operating relationship therewith) includes a pair of surfaces 60 which bear the same relationship to one another as the angled faces 56 do to each other. When the member 58 is slid longitudinally into co-operating relationship with the half shells 48 and 50, the surfaces 60 come into face-to-face relationship with the angled faces 56 and prevent the half shells moving apart. The fastening member 58 thus acts as a strap.

The embodiment illustrated in FIG. 9 is similar to that illustrated in FIG. 8 except in that the cross-sectional shapes of the recess 52 and rib 54 have been altered as have the configurations of the angled faces 56 and surfaces 60. In operation, however, the embodiment of FIG. 9 does not differ in any significant respect from the embodiment of FIG. 8.

In FIG. 1, ribs and recesses are shown at 62. These enable initial alignment of the sections 12 and 14 to be obtained prior to the insertion of the members 30.

Figure 10:
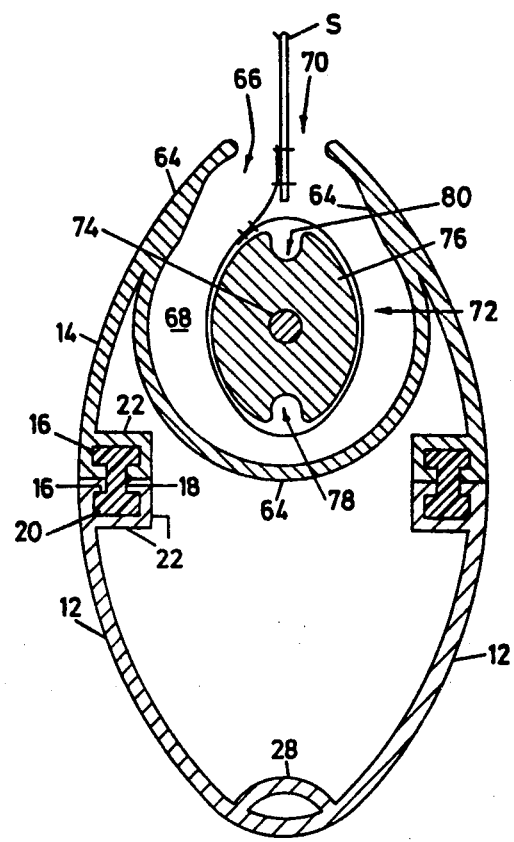
FIG. 10 illustrates a mast or boom with a furling arrangement.

FIG. 10 can be considered as being a horizontal section through a mast or a vertical section through a boom. This latter construction will be described.

Walls of the shell 14 which are generally indicated at 64 form a longitudinally extending recess 66 which comprises an almost circular cavity 68 internally of the boom and an upwardly open mouth 70 which places the recess 66 in communication with the exterior of the boom. A sail reefing device 72 is diagrammatically shown in the cavity 68.

The reefing device comprises a stay 74 which passes through a torque tube 76, the ends of the stay being fixed and the torque tube 76 being rotatable on the stay. The longer edge of the main sail S is suitably lashed to the tube 76.

One end of the torque tube 76 is secured to a rotor assembly (not shown) which includes a ratchet mechanism. A reefing control line extends from the ratchet mechanism to, for example, the cockpit of the vessel so that reefing can be controlled from there.

When the reefing control line is pulled, the rotor assembly, together with the torque tube 76, rotates. The sail S is entrained by the rotating tube 76 and is thus rolled onto the tube 76. A lateral pull on the reefing control line releases the ratchet mechanism whereupon the normal wind forces on the sail cause rotation of the torque tube 76 in the opposite direction and the sail is unreefed. This continues until the reefing control line is released to re-lock the ratchet.

Where the structure of FIG. 10 is a mast, the grooves 78 and 80 of the tube 76 receive the main sail halliard and the main sail bolt rope respectively. Neither of these ropes has been shown. An upper roller sheave is secured to the upper end of the stay 36 and the halliard passes over this. The roller sheave is mounted on the mast in such manner as to be capable of rotation. The lower end of the tube 76 is connected to the rotor assembly.

When the reefing control line is pulled, the lower rotor assembly, together with the torque tube 76, rotates. The halliard moves with the tube 76 and this has the effect of rolling the main sail onto the tube 76. It will be understood that the upper roller sheave over which the halliard is passed must rotate with the torque tube 76 to prevent twisting of the halliard and this in turn results in the stay 74 rotating.

One possible method of manufacture of the mast or boom is to extrude the aluminium shells 12 and 14 and the member 30. Thereafter, the shells are placed in juxtaposition thereby to produce the cavities, the members 30 inserted into one end of one cavity and the other end of the other cavity. By pulling in opposite directions on the two members 30 they are drawn into the cavities, there being no significant net force on the structure during this drawing procedure. A similar procedure can be adopted to fabricate the structures of FIGS. 8 and 9.

Where the cavity formed by the two juxtaposed shells is of closed cross-section, as in all Figures except FIGS. 8 and 9, an alternative method of manufacture can be employed. In this method (see FIG. 11), the shells are juxtaposed to form the cavities and extrusion nozzles N are inserted into opposite ends of one of the cavities. The two extrusion nozzles are fed into the cavity until they are adjacent one another at the central region of shells. Thereafter, synthetic plastics material is extruded directly into the cavity, the pressure of the extruded material forcing the nozzles apart until the cavity is filled. Subsequently the nozzles are inserted in the other cavity. Of course, if four nozzles are available, then both cavities can be filled simultaneously. On the other hand, if only a single nozzle is available then one end of each cavity can be plugged and the single nozzle used to fill the full length of each cavity.

Polystyrene inserts 82 (FIG. 1) can be provided within the mast and can extend the full height of the mast. These are fairly loose fits and serve to prevent any ropes passing upwardly through the mast from rattling against the inner faces of the shells 12 and 14. They have the additional function that, should the mast be lost overboard, they impart sufficient buoyancy thereto to keep it afloat for long enough for it to be retrieved.

If desired, a columnar structure in accordance with the invention could comprise two solid, half ovals with one or more slots 16 in the flat faces thereof. According to yet another form, the structure comprises three, four or more shells which are joined together in the manner described.

Hollow columns can serve as irrigation pipes. Furthermore they can be used in place of the present towers to support the rotor heads of wind driven pumps. The drive shaft can pass downwardly through the structure.

I claim:

1. A longitudinally split hollow columnar structure comprising first and second extruded relatively thin-walled sections, having inwardly directed longitudinal edges, the longitudinally extending edges of the first section being juxtaposed to longitudinally extending edges of said second section, each of said sections including a slot extending in the direction of elongation of the section, each slot, in cross-section, having a narrow entrance portion leading to a wider portion and said sections being arranged with said narrow entrance portions of the slots continuous, and a fastening member having a cross-sectional shape compatible with the configuration of the longitudinally extending cavity constituted by said co-operating slots, said fastening member extending in the direction of elongation of said sections and inter-engaging with faces to both sections in radial and peripheral directions to releasably lock said sections to prevent separation thereof radially and peripherably.

2. A structure according to claim 1, in which the cavity and said member are of H-shape in cross-section.

3. A structure according to claim 1, in which the cavity and said member are of the shape formed by two spaced circles joined by a portion of rectangular cross-section.

4. A structure according to claim 1, in which said sections are aluminium extrusions.

5. A structure according to claim 1, in which said member is of nylon.

6. A structure as claimed in claim 1, in which a cavity is provided within the structure, the cavity extending in the direction of the length of the structure and having an elongated mouth which places said cavity in communication with the exterior of the structure, there being a sail reefing device within said cavity.

7. A method manufacturing a columnar structure which method comprises juxtaposing a longitudinally extending edge of one relatively thin-walled extruded section of the structure to a longitudinally extending edge of another relatively thin-walled extruded section of the structure, and interengaging a fastening member with radially and peripherally extending faces of both said sections to prevent radial and peripheral separation of said sections, the fastening member being interengaged with said faces by sliding it in the longitudinal direction.

8. A method of manufacturing a columnar structure which method comprises juxtaposing a longitudinally extending edge of an elongate relatively thin-walled extruded first section to a longitudinally extending edge of an elongate relatively thin-walled extruded second section, the edges of said sections being profiled so as together to bound and form a cavity extending in the direction of elongation of said sections and defined by radially and peripherally extending faces, placing an extrusion nozzle in said cavity, and extruding synthetic plastics material directly into said cavity to form a fastening member which is interengaged with at least with the said faces of said sections to prevent radial and peripheral separation of said sections.

9. A method according to claim 8, in which nozzles are inserted into said cavity from opposite ends thereof, synthetic plastics material being extruded from both said nozzles and serving to force the nozzles apart as the portion of the cavity between said nozzles fills with material.

10. A method according to claim 9, in which each of said sections has a recess therein extending in the direction of elongation thereof, each recess being of T-shape, and the uprights of the two T-shaped recesses being contiguous to form a slot of H-shape.

* * * * *